United States Patent
Kato et al.

(10) Patent No.: US 7,203,498 B2
(45) Date of Patent: Apr. 10, 2007

(54) TRANSMISSION RATE SWITCHING CONTROL METHOD FOR MOBILE COMMUNICATION SYSTEM AND MOBILE COMMUNICATION CONTROL APPARATUS

(75) Inventors: Yasuhiro Kato, Yokohama (JP); Kazunori Obata, Yokosuka (JP); Junichiro Hagiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 842 days.

(21) Appl. No.: 10/600,336

(22) Filed: Jun. 23, 2003

(65) Prior Publication Data
US 2004/0005885 A1  Jan. 8, 2004

(30) Foreign Application Priority Data
Jun. 24, 2002  (JP) .............................. 2002-183486

(51) Int. Cl.
*H04Q 7/20* (2006.01)
(52) U.S. Cl. ................... 455/452.2; 455/453
(58) Field of Classification Search ............ 455/452.2, 455/453, 512, 513
See application file for complete search history.

(56) References Cited

U.S. PATENT DOCUMENTS

| | | | |
|---|---|---|---|
| 7,079,847 B2 * | 7/2006 | Blair et al. ............... | 455/452.2 |
| 2004/0005898 A1 * | 1/2004 | Kato et al. .................. | 455/450 |
| 2004/0198359 A1 * | 10/2004 | Uchida et al. .............. | 455/441 |
| 2004/0213192 A1 * | 10/2004 | Kobayashi ................... | 370/338 |
| 2005/0030964 A1 * | 2/2005 | Tiedemann et al. ......... | 370/431 |
| 2005/0041618 A1 * | 2/2005 | Wei et al. .................... | 370/328 |
| 2005/0213335 A1 * | 9/2005 | Hunt ........................... | 362/321 |
| 2006/0248431 A1 * | 11/2006 | Yoon et al. .................. | 714/755 |

FOREIGN PATENT DOCUMENTS

| | | |
|---|---|---|
| WO | WO 99/53700 | 10/1999 |
| WO | WO 00/64103 | 10/2000 |
| WO | WO 01/62024 | 8/2001 |

* cited by examiner

*Primary Examiner*—Creighton Smith
(74) *Attorney, Agent, or Firm*—Oblon, Spivak, McClelland, Maier & Neustadt, P.C.

(57) ABSTRACT

After a switch of a transmission rate for a mobile station, the next switch of the transmission rate for the mobile station is halted for a predetermined period of time. Thus, deterioration in resource use efficiency can be prevented, and a switch to a high transmission rate for another mobile station requiring the high transmission rate can be smoothly performed, thus the throughput quality can be maintained.

A wireless base station or a control station switches a transmission rate for each mobile station in accordance with the amount of information transmitted and received, and, after switching a transmission rate for one of the mobile stations, halts the next switch control of transmission rates for the mobile station for a predetermined period of time, thus optimizing system performance. A switch halt period is variably set depending on whether a current transmission rate and a switched transmission rate are higher or lower, or in accordance with the number of remaining resources.

4 Claims, 4 Drawing Sheets

| CURRENT RATE | REMAINING RESOURCES ARE LARGE | | REMAINING RESOURCES ARE SMALL | |
| --- | --- | --- | --- | --- |
| | TO LOWER RATE | TO HIGHER RATE | TO LOWER RATE | TO HIGHER RATE |
| LOW | - | 1 SEC. | - | 3 SECS. |
| MID. | 5 SECS. | 1 SEC. | 15 SECS. | 3 SECS. |
| HIGH | 1 SEC. | - | 3 SECS. | - |

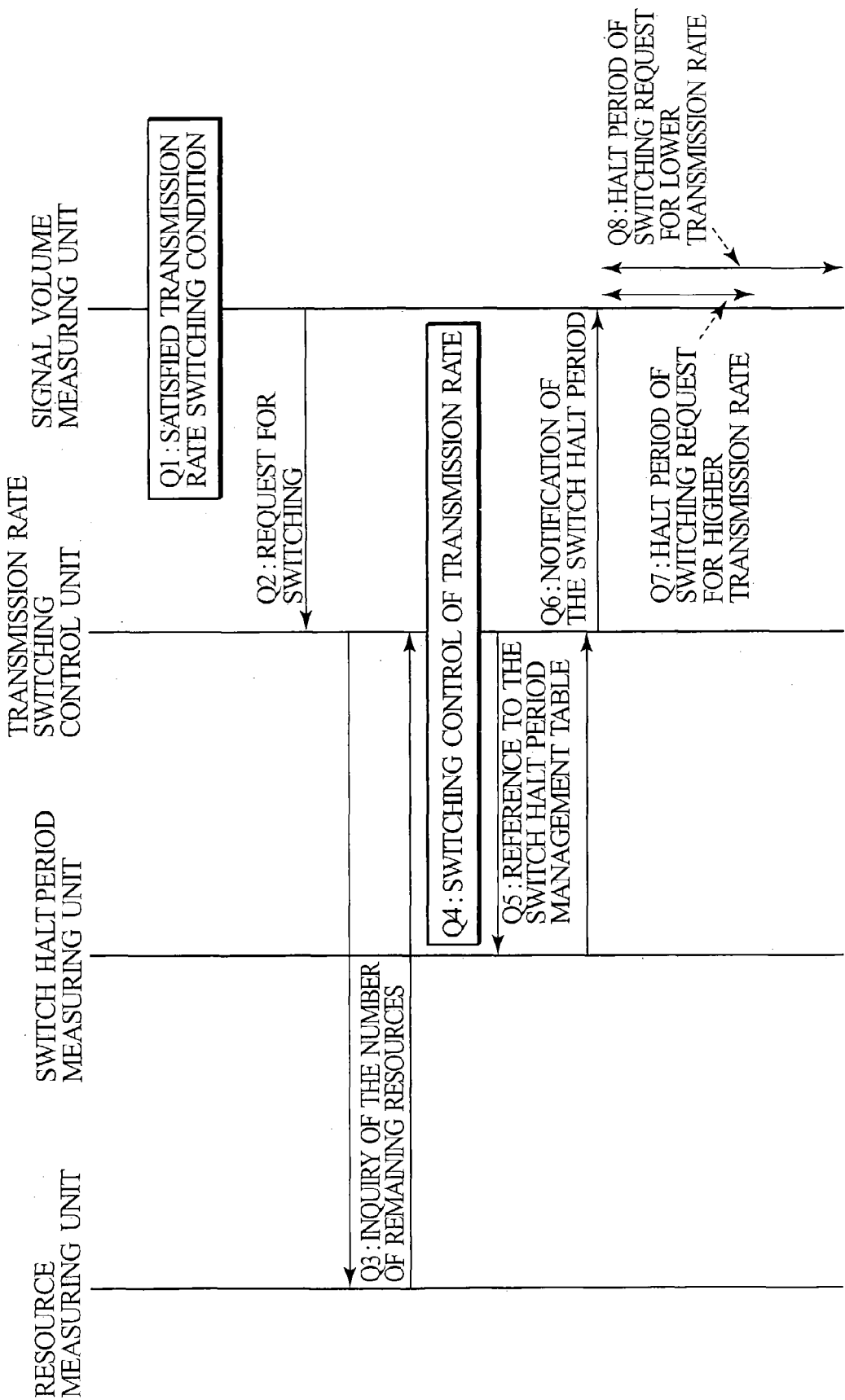

TRANSMISSION RATE SWITCHING CONTROL METHOD FOR MOBILE COMMUNICATION SYSTEM AND MOBILE COMMUNICATION CONTROL APPARATUS

CROSS-REFERENCE TO RELATED APPLICATION

This application is based upon and claims the benefit of priority from the prior Japanese Patent Application NO. 2002-183486, filed on Jun. 24, 2002. The entire contents of which are incorporated herein by reference.

BACKGROUND OF THE INVENTION

1. Field of the Invention

The present invention relates to a transmission rate switching control method for a mobile communication system which permits a plurality of mobile stations to share the same resources and, during the communication process, switches a transmission rate for each mobile station in accordance with the amount of information transmitted and received. The present invention further relates to the mobile communication system and a mobile communication control apparatus.

2. Description of the Related Art

There is a well known transmission rate switching control technique for a "FOMA (product name)" system which employs CDMA (Code Division Multiple Access), a third generation mobile communication system.

This conventional mobile communication system provides a packet communication service at a maximum transmission rate of 384 kbps. However, since many resources are consumed to obtain the maximum transmission rate, an upper limit is imposed on the number of mobile stations which can simultaneously perform communication at the 384 kbps transmission rate. The resources in this case are a transmission power resource unique to the CDMA system and a scramble code resource. Many of both types of resources must be allocated to attain a high transmission rate. Accordingly, an upper limit is imposed on the number of mobile stations which can simultaneously perform communication at the 384 kbps transmission rate.

Therefore, to efficiently apportion the limited number of available resources among the mobile stations, the conventional mobile communication system employs a method in which for high speed communication requiring many resources, the transmission rate is reduced in accordance with the remaining number of resources so as to allocate the resources. This method prevents a phenomenon which occurs wherein the resources are exclusively used by a small number of mobile stations having high transmission rates, and call loss probability is increased.

Further, the conventional mobile communication system switches the transmission rate in accordance with the amount of information transmitted and received. That is, the conventional mobile communication system increases the transmission rate when a predetermined number of signals or more is stored in a transmission buffer, or reduces the transmission rate when a predetermined amount of information or less is transmitted. In this manner, only the required resources are controlled to be allocated at all times, and an efficient use of the resources is ensured.

However, since the conventional mobile communication system performs transmission rate switching control which alters the transmission rate in accordance with a change in the amount of information being transmitted or received, a switching control load imposed on the mobile station and the control station may be increased when the amount of information greatly fluctuates.

Furthermore, when a request for a switch to a high transmission rate is received in the circumstances where only a few resources remain, allocation of the resources is performed while the transmission rate is reduced. Accordingly, another request for a switch to a higher transmission rate may be received sequentially, and the control load may be increased.

As a countermeasure for these problems, a method is conceivable in which after switching a transmission rate, the following switching control is uniformly halted for a predetermined period of time. However, when this technique is employed, the occurrence of other problems is predicted, that is, throughput may be reduced due to a delay in switching to a high transmission rate, and since a processing time for switching from the high transmission rate to the lower transmission rate is extended, resource use efficiency may be deteriorated, so that the resources can not be allocated to another mobile station requiring a high transmission rate.

SUMMARY OF THE INVENTION

To resolve the above-described technical problems, it is an object of the present invention to provide a transmission rate switching control technique for a mobile communication system in which after a switch of a transmission rate for a mobile station, the next switch of the transmission rate for the mobile station is halted for a predetermined period of time, so that an increase in a control load can be suppressed while a deterioration in resource use efficiency can be prevented, and a switch to a high transmission rate can be smoothly performed for another mobile station requiring a high transmission rate.

A first aspect of the present invention is a transmission rate switching control method for a mobile communication system which permits a plurality of mobile stations to share the same resources and, in accordance with the amount of information transmitted and received, switches a transmission rate for each mobile station. The transmission rate switching control method includes a step of switching the transmission rate for each mobile station in accordance with the amount of information transmitted or received, and a step of, after a switch of the transmission rate for one of the mobile stations, halting the next switching control of the transmission rate for the mobile station for a predetermined period of time.

According to the transmission rate switching control method for the mobile communication system of the first aspect of the present invention, the transmission rate is switched for each mobile station in accordance with the amount of information transmitted and received, and after a switch of the transmission rate for one of the mobile stations, the next switching control of the transmission rate for the mobile station is halted for a predetermined period of time. Thus, system performance is optimized in terms of throughput quality, efficient resource use and load control.

A second aspect of the present invention is the transmission rate switching control method for the mobile communication system of the first aspect, wherein the predetermined period of time is set for each current transmission rate and for each subsequent transmission rate. A switch halt period is changed depending on whether a current transmission rate and a switched transmission rate are higher or lower. Thus the system performance is optimized in terms of throughput quality, efficient resource use and load control.

A third aspect of the present invention is the transmission rate switching control method for the mobile communication system of the first or second aspect, wherein the predetermined period is set in accordance with the number of remaining resources. A switch halt period is changed in accordance with the number of remaining resources, and thus the system performance is optimized in terms of throughput quality, efficient resource use and load control.

A fourth aspect of the present invention is a mobile communication system which permits a plurality of mobile stations to share the same resources and, in accordance with the amount of information transmitted and received, switches a transmission rate for each mobile station. The mobile communication system includes a transmission rate switching controller for switching the transmission rate for each mobile station in accordance with the amount of information transmitted and received, and a switching control halting means for, after a switch of the transmission rate for one of the mobile stations, halting the next switching control of the transmission rate for the mobile station for a predetermined period of time.

According to the mobile communication system of the fourth aspect of the invention, the transmission rate switching controller switches the transmission rate for each mobile station in accordance with the amount of information transmitted and received, and after the transmission rate is switched for one of the mobile stations, the switching control halting means halts, for a predetermined period of time, the next switching control of the transmission rate for the mobile station. Thus, system performance is optimized in terms of throughput quality, efficient resource use and load control.

A fifth aspect of the present invention is the mobile communication system of the fourth aspect, wherein the transmission rate switching controller sets the predetermined period of time for each current transmission rate and for each subsequent transmission rate. A switch halt period is changed depending on whether a current transmission rate and a switched transmission rate are higher or lower. Thus, the system performance is optimized in terms of throughput quality, efficient resource use and load control.

A sixth aspect of the present invention is the mobile communication system of the fourth or the fifth aspect, wherein the transmission rate switching controller sets the predetermined period of time in accordance with the number of remaining resources. A switch halt period is changed in accordance with the number of remaining resources, and thus the system performance is optimized in terms of throughput quality, efficient resource use and load control.

A seventh aspect of the present invention is a mobile communication control apparatus which permits a plurality of mobile stations to share the same resources and, in accordance with the amount of information transmitted and received, switches a transmission rate for each mobile station. The mobile communication control apparatus includes a transmission rate switching controller for switching the transmission rate for each mobile station in accordance with the amount of information transmitted and received, and a switching control halting means for, after a switch of the transmission rate for one of the mobile stations, halting the next switching control of the transmission rate for the mobile station for a predetermined period of time.

According to the mobile communication control apparatus of the seventh aspect of the invention, the transmission rate switching controller switches the transmission rate for each mobile station in accordance with the amount of information transmitted and received, and after the transmission rate is switched for one of the mobile stations, the switching control halting means halts, for a predetermined period of time, the next switching control of the transmission rate for the mobile station. Thus, system performance is optimized in terms of throughput quality, efficient resource use and load control.

An eighth aspect of the present invention is the mobile communication control apparatus of the seventh aspect, wherein the transmission rate switching controller sets the predetermined period of time for each current transmission rate and for each next transmission rate. A switch halt period is changed depending on whether a current transmission rate and a switched transmission rate are higher or lower, and thus the system performance is optimized in terms of throughput quality, efficient resource use and load control.

A ninth aspect of the present invention is the mobile communication control apparatus of the seventh or the eighth aspect, wherein the transmission rate switching controller sets the predetermined period of time in accordance with the number of remaining resources. A switch halt period is changed in accordance with the number of remaining resources, and thus the system performance is optimized in terms of throughput quality, efficient resource use and load control.

BRIEF DESCRIPTION OF THE DRAWINGS

FIG. 3 is a diagram for explaining a switch halt period management table managed by a switch halt period management unit in the mobile communication system according to the embodiment; and FIG. 4 is a diagram showing the sequence of the transmission rate switching control performed by the mobile communication system according to the embodiment.

DETAILED DESCRIPTION OF THE PREFERRED EMBODIMENT

Figure 1:
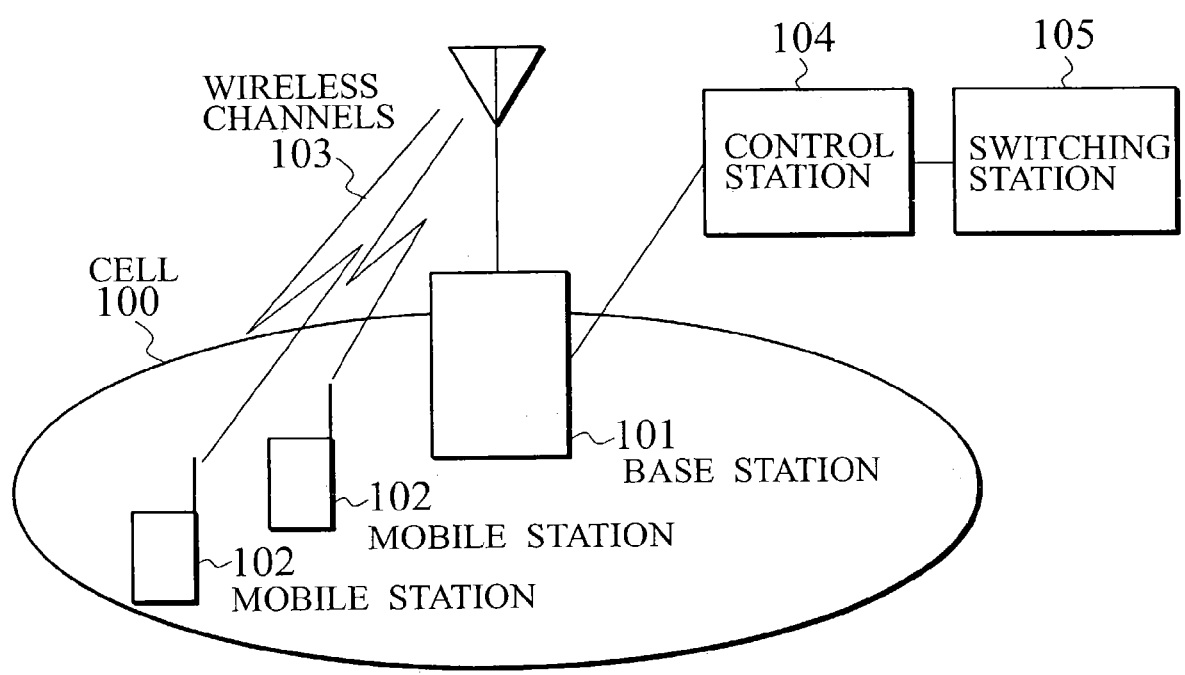
FIG. 1 is a block diagram showing a mobile communication system according to one embodiment of the present invention.

The preferred embodiment of the present invention will now be described in detail with reference to the accompanying drawings. FIG. 1 shows the configuration of a mobile communication system according to one embodiment of the present invention. A wireless base station 101 performs communication with a plurality of mobile stations 102 located in a wireless zone (cell) 100 covered by the wireless base station 101. Wireless channels 103 are set up between the wireless base station 101 and the mobile stations 102. A control station 104 is connected to the wireless base station 101 to control the wireless base station 101 and the mobile stations 102, and a mobile switching station 105 is connected to the control station 104.

One wireless channel 103 is set up for each mobile station 102, and the transmission rate can be switched while communication is in process. Wireless resources for setting up the wireless channels are used commonly by the mobile stations 102 in the cell 100.

Figure 2:
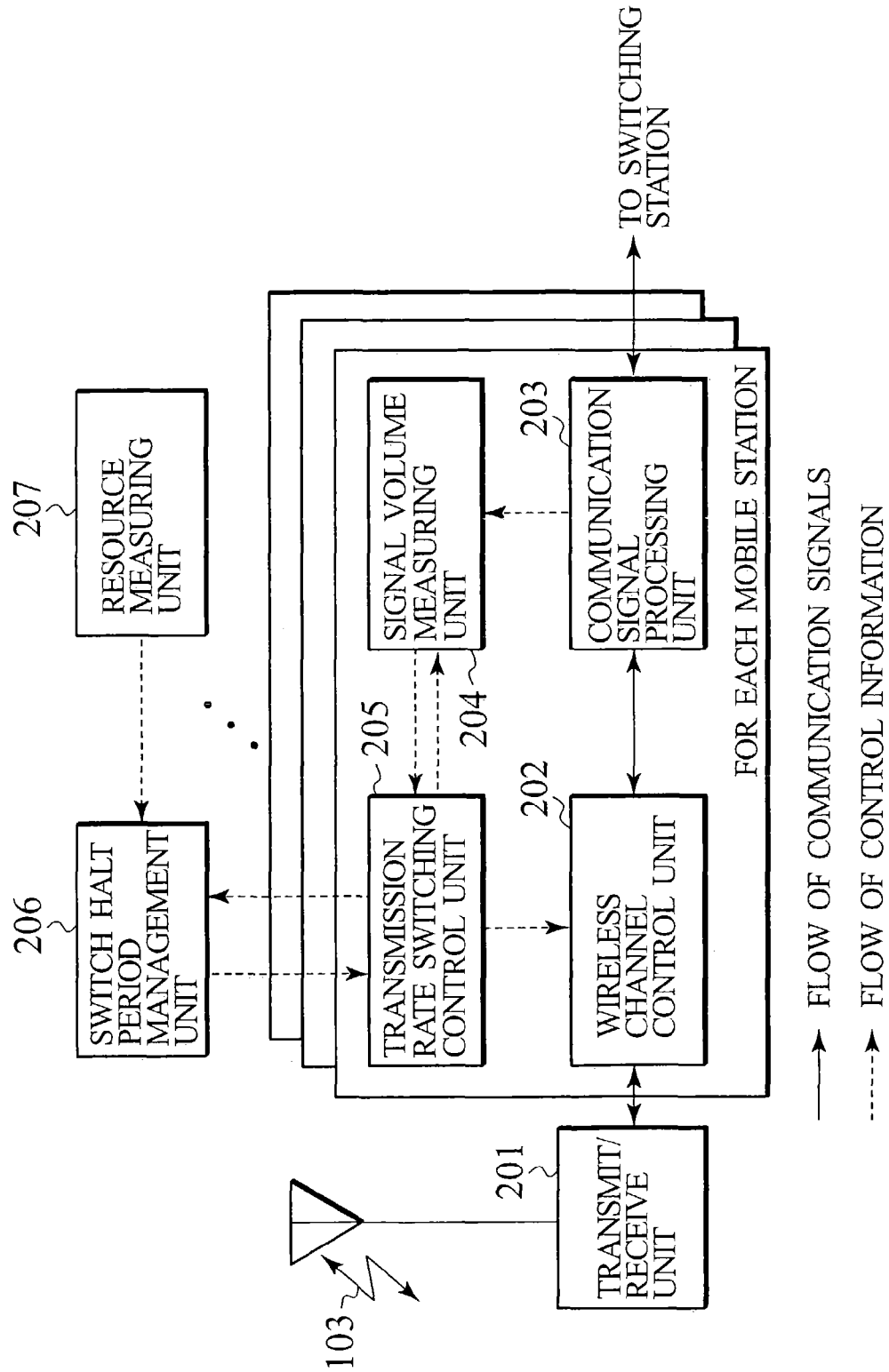
FIG. 2 is a block diagram showing a transmission rate switching control function which is provided either for a wireless base station or a control station, or is jointly shared by both the wireless base station and the control station, in the mobile communication system according to the embodiment.

FIG. 2 shows the functional structure of the wireless base station 101 and the control station 104. Except for a transmit/receive unit 201, this structure can be provided for either of the wireless base station 101 and the control station 104. In FIG. 2, solid arrows represent flows of communication signals, and broken arrows represent flows of information required for controlling each processing unit.

The transmit/receive unit 201 performs demultiplexing of the wireless channels 103, CDMA baseband processing, and modulation/demodulation processing. A wireless channel control unit 202 performs setting control on the wireless channel 103 between the mobile station 102 and the wireless base station 101. A communication signal processing unit 203 performs, for the wireless channel 103, relay processing of a communication signal, such as a speech signal or packet data, which is transmitted to or received from the mobile switching station 105 via the control station 104. The communication signal processing unit 203 also performs transmission buffering processing for the communication signal.

A signal volume measurement unit 204 measures a signal volume based on the amount of information transmitted and received by the communication signal processing unit 203, and the amount of information stored in a transmission buffer. When the signal volume exceeds a predetermined value, the signal volume measurement unit 204 requests that a transmission rate switching control unit 205 switch a transmission rate to a higher rate or to a lower rate. It should be noted, however, that when the instruction to halt a switching request is received from the transmission rate switching control unit 205, the signal volume measurement unit 204 halts the switching request for a switch halt period defined in accordance with each of high transmission rates and low transmission rates.

In response to a switching request from the signal volume measurement unit 204, the transmission rate switching control unit 205 performs a process for switching a transmission rate of the wireless channel 103, and after the transmission rate is switched, performs a process for giving an instruction to halt a switching request to the signal volume measurement unit 204.

In accordance with each transmission rate and each information item from a resource measurement unit 207, a switch halt period management unit 206 manages a switch halt period in the case of switching the transmission rate to a higher rate, and a switch halt period in the case of switching the transmission rate to a lower rate. The resource measurement unit 207 manages the number of wireless resources being used in the cell 100, and transmits the number of wireless resources to the switch halt period management unit 206.

FIG. 3 shows a setting example of a switch halt period management table 210 managed by the switch halt period management unit 206. In the switch halt period management table 210, values of the switch halt period are set in accordance with a high, medium or low rate of a current transmission rate, and a large or small number of remaining resources. The transmission rate switching control unit 205 refers to the values in this table, and gives an instruction to halt a switching request to the signal volume measurement unit 204.

An explanation will now be given for a transmission rate switching control operation performed by the mobile communication system constituted as described above, with reference to the sequence diagram in FIG. 4.

<Sequences Q1 and Q2> When a transmission rate switching condition has been satisfied, the signal volume measurement unit 204 issues a switching request to the transmission rate switching control unit 205.

<Sequences Q3 and Q4> The transmission rate switching control unit 205 inquires as to the number of remaining resources of the resource measurement unit 207, and thereafter, performs the transmission rate switching control. During this transmission rate switching control, the transmission rate switching control unit 205 reduces the transmission rate when the number of remaining resources is small.

<Sequences Q5 and Q6> After switching the transmission rate, the transmission rate switching control unit 205 refers to the switch halt period management table 210, and determines a switch halt period in the case of switching a current transmission rate to a higher rate, and a switch halt period in the case of switching the current transmission rate to a lower rate. Thereafter, the transmission rate switching control unit 205 notifies the signal volume measurement unit 204 of the switch halt periods.

<Sequences Q7 and Q8> For the pertinent period, the signal volume measurement unit 204 halts switching requests. In the example in FIG. 4, the period in the case of switching to the lower transmission rate is longer than the period in the case of switching to the higher transmission rate.

For example, (1) when the rate switching control is performed so as to reduce the transmission rate to a medium rate in the circumstances where the current transmission rate is high and the number of remaining resources is small, the switch halt period is determined to be three seconds. (2) When the rate switching control is performed to reduce the transmission rate to a low rate in the circumstances where the current transmission rate is a medium rate and the number of remaining resources is small, the switch halt period is determined to be fifteen seconds.

Besides the above examples, for example, (3) when the rate switching control is performed so as to increase the transmission rate to a high rate in the circumstances where the current transmission rate is a medium rate and the number of remaining resources is large, the switch halt period is determined to be one second. (4) When the rate switching control is performed so as to reduce the transmission rate to a medium rate in the circumstances where the current transmission rate is high and the number of remaining resources is large, the switch halt period is determined to be one second.

Since the above described transmission rate switching control method is employed by the mobile communication system of this embodiment, immediately after the transmission rate is switched, the wireless base station 101 can halt the next transmission rate switching control for a predetermined switch halt period in accordance with the number of remaining resources. Furthermore, the switch halt period can be changed depending on whether a current transmission rate and a switched transmission rate are higher or lower. By setting this switch halt period to an appropriate value, system performance can be optimized in terms of throughput quality, efficient resource use and load control.

Specific setting examples are as follows.

(I) If the throughput quality and the efficient resource use are given high priority, minimum values are set for the switch halt periods for all the transmission rates switched to higher rates as well as the transmission rates switched to lower rates. It should be noted, however, that in this case a maximum control load is expected.

(II) If the throughput quality is given high priority and a balance between the efficient resource use and suppression of the control load is taken, minimum values are set for the switch halt periods for all the transmission rates switched to higher rates, so that the transmission rate can be smoothly switched to a higher rate in accordance with the amount of information. On the other hand, as for the transmission rates switched to lower rates, a minimum value is set for the switch halt period when the current transmission rate is high, so that the resources can be released at an early stage. A relatively large value is set for the switch halt period when the current transmission rate is a medium rate, so that the control load, which is imposed when the low transmission rate and the medium transmission rate are switched, can be reduced.

(III) If a resource share among the mobile stations 102 is given priority, the switch halt period for the transmission rate switched to a higher rate is set to a larger value as the transmission rate is increased. Thus, the effects produced by the resource share at the low to medium transmission rates can be expected.

Note that, in any case of (I) to (III), when the number of remaining resources becomes small and a switching request is issued frequently, the control load can be suppressed by setting relatively large values for all the switch halt periods.

As described above, according to the present invention, the transmission rate is switched for each mobile station in accordance with the amount of information transmitted and received, and after a transmission rate for one of the mobile stations is switched, the next switching control of the transmission rate for the mobile station is halted for a predetermined period of time. Thus, the system performance is optimized in terms of throughput quality, efficient resource use and load control. The system performance can be optimized in terms of throughput quality, efficient resource use and load control, especially by changing the switch halt period depending on whether a current transmission rate and a switched transmission rate are higher or lower, and by changing the switch halt period in accordance with the number of remaining resources.

What is claimed is:

1. A transmission rate switching control method for a mobile communication system where the system permits a plurality of mobile stations to share the same resources and, in accordance with the amount of information transmitted and received, switches a transmission rate for each mobile station, the method comprising the steps of:
   switching the transmission rate for each mobile station in accordance with the amount of information transmitted or received; and,
   after switching the transmission rate for a certain mobile station of the mobile stations, halting the next switching control of the transmission rate for the certain mobile station for a predetermined period of time.

2. A mobile communication control apparatus for permitting a plurality of mobile stations to share the same resources and, in accordance with the amount of information transmitted and received, for switching a transmission rate for each mobile station, comprising:
   a transmission rate switching controller configured to switch the transmission rate for each mobile station in accordance with the amount of information transmitted and received; and
   a switching control halting unit configured, after a switch of the transmission rate for a certain mobile station, to halt the next switching control of the transmission rate for said mobile station for a predetermined period of time.

3. A mobile communication control apparatus in accordance with claim 2, wherein the transmission rate switching controller sets the predetermined period of time for halting the switching control of the transmission rate for the certain mobile station in accordance with the current transmission rate and the next transmission rate to be switched to.

4. A mobile communication control apparatus in accordance with claim 2, wherein the transmission rate switching controller sets the predetermined period of time for halting the switching control of the transmission rate for the certain mobile station in accordance with the number of remaining resources.

* * * * *